（12） United States Patent
Zheng et al.

(10) Patent No.: US 7,733,570 B2
(45) Date of Patent: Jun. 8, 2010

(54) CONDENSER

(75) Inventors: Yujin Zheng, Hamamatsu (JP);
Hirofumi Miyajima, Hamamatsu (JP);
Hirofumi Kan, Hamamatsu (JP)

(73) Assignee: Hamamatsu Photonics K.K.,
Hamamatsu-shi, Shizuoka (JP)

( * ) Notice: Subject to any disclaimer, the term of this patent is extended or adjusted under 35 U.S.C. 154(b) by 855 days.

(21) Appl. No.: 10/525,670

(22) PCT Filed: Aug. 28, 2003

(86) PCT No.: PCT/JP03/10963

§ 371 (c)(1),
(2), (4) Date: Nov. 7, 2005

(87) PCT Pub. No.: WO2004/021068

PCT Pub. Date: Mar. 11, 2004

(65) Prior Publication Data

US 2006/0152811 A1    Jul. 13, 2006

(30) Foreign Application Priority Data

Aug. 30, 2002   (JP) ............................. 2002-253852

(51) Int. Cl.
*G02B 27/14* (2006.01)
*G02B 27/30* (2006.01)
(52) U.S. Cl. ...................................... 359/629; 359/641
(58) Field of Classification Search ................. 359/629
See application file for complete search history.

(56) References Cited

U.S. PATENT DOCUMENTS 4,986,939 A   1/1991   Hoffmann (Continued)

FOREIGN PATENT DOCUMENTS

DE   197 51 716   5/1998

(Continued)

OTHER PUBLICATIONS

Satoshi Yamaguchi et al., "Collimation of Emissions From A 1-cm Aperture Tightly Arranged, Multistripe Laser-Diode Bar With a Multiprism Array Coupling", Applied Optics, vol. 36, No. 9, Mar. 20, 1997, pp. 1875-1878.

(Continued)

*Primary Examiner*—Jordan M. Schwartz
*Assistant Examiner*—James C Jones
(74) *Attorney, Agent, or Firm*—Drinker Biddle & Reath LLP

(57) ABSTRACT

An optical condenser device has light sources (10, 20) and an optical combiner (30). Each light source (10, 20) includes a semiconductor laser array stack (12, 22), collimator lenses (16, 26), and beam converters (18, 28). Since the optical combiner (30) combines the beams from one (12) of the stacks and the beams from the other (22), a laser beam with high optical density is generated. The optical combiner (30) has transmitting portions (32) and reflecting portions (34), each of which preferably has a strip-like shape elongated in the layering directions of the stacks (12, 22). In this case, the beams emitted from the active layers (14, 24) will be received and combined appropriately by the optical combiner (30) even if positional deviation of the active layers (14, 24) occurs.

8 Claims, 13 Drawing Sheets

U.S. PATENT DOCUMENTS

| | | | |
|---|---|---|---|
| 5,004,328 A | | 4/1991 | Suzuki et al. |
| 5,048,030 A | * | 9/1991 | Hiiro .......................... 372/68 |
| 5,212,710 A | * | 5/1993 | Kaneda et al. ................ 372/71 |
| 5,513,201 A | | 4/1996 | Yamaguchi et al. |
| 6,185,042 B1 | | 2/2001 | Lomb et al. |
| 6,456,436 B2 | | 9/2002 | Miura et al. |
| 6,680,800 B1 | * | 1/2004 | Schreiber et al. ............ 359/618 |
| 2002/0089755 A1 | | 7/2002 | Yamazaki et al. |
| 2002/0131178 A1 | | 9/2002 | Kusuyama |
| 2002/0191296 A1 | * | 12/2002 | Kusuyama ................ 359/619 |
| 2003/0151820 A1 | * | 8/2003 | Gao et al. ................... 359/618 |
| 2004/0067016 A1 | * | 4/2004 | Anikitchev et al. ........... 385/34 |
| 2004/0091013 A1 | * | 5/2004 | Yamaguchi et al. ......... 372/108 |
| 2004/0252743 A1 | * | 12/2004 | Anikitchev et al. ........... 372/97 |
| 2006/0103939 A1 | | 5/2006 | Zheng et al. |

FOREIGN PATENT DOCUMENTS

| | | |
|---|---|---|
| DE | 199 39 750 | 3/2001 |
| DE | 19939750 | 3/2001 |
| EP | 0 317 153 | 5/1989 |
| EP | 1 006 382 | 6/2000 |
| JP | 57-181516 | 11/1982 |
| JP | 58-168026 | 10/1983 |
| JP | 04-284401 | 10/1992 |
| JP | 06-281854 | 10/1994 |
| JP | 7-98402 | 4/1995 |
| JP | 3071360 | 4/1995 |
| JP | 7-287104 | 10/1995 |
| JP | 7-287189 | 10/1995 |
| JP | 08-062531 | 3/1996 |
| JP | 09-096760 | 4/1997 |
| JP | 09-181376 | 7/1997 |
| JP | 09-184997 | 7/1997 |
| JP | 10-510933 | 10/1998 |
| JP | 11-072743 | 3/1999 |
| JP | 2001-083460 | 3/2001 |
| JP | 2001-111147 | 4/2001 |
| JP | 2001-215443 | 8/2001 |
| JP | 2002-009385 | 1/2002 |
| WO | 97/14073 | 4/1997 |
| WO | WO 99/46625 | 9/1999 |
| WO | 99/57791 | 11/1999 |
| WO | 01/06297 | 1/2001 |
| WO | 01/35145 | 5/2001 |
| WO | 01/35146 | 5/2001 |
| WO | 01/35147 | 5/2001 |
| WO | 02/077698 | 10/2002 |

OTHER PUBLICATIONS

Satoshi Yamaguchi et al., "Collimation of Emissions From a High-Power Multistripe Laser-Diode Bar With Multiprism Array Coupling and Focusing to a Small Spot", Optics Letters, vol. 20, No. 8, Apr. 15, 1995, pp. 898-900.

Satoshi Yamaguchi et al., "Collimation of Emissions from a 1-cm Aperture Tightly Arranged, Multistripe Laser-Diode Bar With a Multiprism Array Coupling," Applied Optics, vol. 36, No. 9, Mar. 20, 1997, pp. 1875-1878.

Satoshi Yamaguchi et al., "Collimation of Emissions from a High-Power Multistripe Laser-Diode Bar with Multiprism Array Coupling and Focusing to a Small Spot," Optics Letters, vol. 20, No. 8, Apr. 15, 1995, pp. 898-900.

Satoshi Yamaguchi, Special Feature: Laser Beam Technology LD Array Light Concentration using a Prism Array, O plus E, No. 210, 1997, pp. 106-112 (including English-language translation).

* cited by examiner (a)

(b)

34  32

(a)

(b)

(c)

(a)

(b)

(c)

(a)

(b)

(c)

(a)

(b)

(c)

(a)

(b)

(c)

(d)

(e)

CONDENSER

TECHNICAL FIELD

This invention relates to an optical condenser device that generates a laser beam with high optical density.

BACKGROUND ART

Semiconductor laser array stacks are known as laser elements with high output. Examples of semiconductor laser array stacks are disclosed in Japanese Laid-Open Publication No. 9-181376 and Japanese Laid-Open Publication No. 2002-9385.

FIG. 2 is a perspective view showing an example of a semiconductor laser array stack. FIG. 3 is a diagram showing a front end surface (light-outputting surface) of a semiconductor laser array. As shown in FIG. 2, a semiconductor laser array stack 12 has a structure wherein a plurality of semiconductor laser arrays 11 and a plurality of heat sinks 13 are positioned alternately. Heat sinks 13 cool laser arrays 11. As shown in FIG. 3, in each semiconductor laser array 11, a plurality of active layers 14 are aligned in parallel in the horizontal direction.

In laser array stack 12, due to laser arrays 11 being layered in the vertical direction, the plurality of active layers 14 are positioned in a matrix-like manner. Each active layer 14 emits laser light. The laser light emitted from these active layers 14 form a single beam. By positioning active layers 14 at a high density, a beam with high optical density is obtained. However in recent years, further improvement of the optical density is being desired.

DISCLOSURE OF THE INVENTION

An object of this invention is to provide an optical condenser device capable of generating a laser beam with very high optical density.

An optical condenser device in accordance with this invention comprises: a first light source; a second light source; and a first optical combiner. The first light source has a first semiconductor laser array stack, a first collimator lens, and a first beam converter. In the first laser array stack, a plurality of semiconductor laser arrays, each having a plurality of active layers aligned in parallel in a first direction, are stacked in a direction perpendicular to the first direction. The first collimator lens collimates a plurality of beams in a plane perpendicular to the first direction, which beams are emitted from the plurality of active layers. The first beam converter receives the beams collimated by the first collimator lens to rotate the transverse sections of the beams by substantially 90°. The second light source has a second semiconductor laser array stack, a second collimator lens, and a second beam converter. In the second laser array stack, a plurality of semiconductor laser arrays, each having a plurality of active layers aligned in parallel in a second direction, are stacked in a direction perpendicular to the second direction. The second collimator lens collimates a plurality of beams in a plane perpendicular to the second direction, which beams are emitted from the plurality of active layers. The second beam converter receives the beams collimated by the second collimator lens to rotate the transverse sections of the beams by substantially 90°. Here, the transverse section of a beam refers to a cross section taken substantially perpendicular to the axis of the beam. The first optical combiner combines the beams from the first light source with the beams from the second light source. The first optical combiner has one or more transmitting portions for receiving and transmitting the beams emitted from the first beam converter, and one or more reflecting portions for receiving and reflecting the beams emitted from the second beam converter. The first optical combiner combines the beams transmitted through the transmitting portions and the beams reflected by the reflecting portions.

The beams from the first laser array stack and the beams from the second laser array stack are combined using the optical combiner. A laser beam with high optical density is thereby generated. Due to the refraction of the collimator lenses, the spread of the beams emitted from the active layers of the laser array stacks are restrained in the plane perpendicular to the direction in which the active layers are aligned. When the transverse sections of the beams are rotated by substantially 90° by the beam converters, the spread of the beams become restrained in the direction in which the active layers are aligned. As a result, the transverse section of each beam is in a shape that is long in the direction of stacking of the semiconductor laser arrays and short in the direction of alignment of the active layers. If the transmitting portions and the reflecting portions of the optical combiner are in a strip-like shape elongated in the direction of the stacking of the laser arrays, the beams emitted from the active layers will be received appropriately by the optical combiner even if positional deviation of the active layers occurs.

Further scope of applicability of this invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BEST MODES FOR CARRYING OUT THE INVENTION

Embodiments of this invention will now be described in detail with reference to the accompanying drawings. In the description of the drawings, the same elements will be provided with the same symbols and redundant description will be omitted.

First Embodiment

Figure 1:
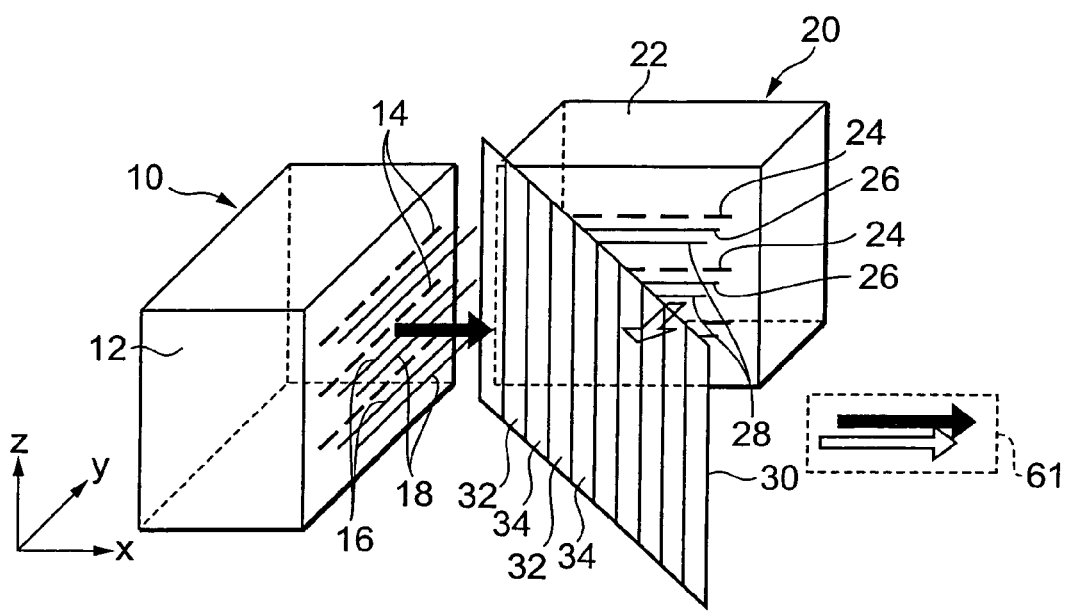
FIG. 1 is a schematic perspective view showing an optical condenser device of a first embodiment.

FIG. 1 is a schematic perspective view showing an optical condenser device of a first embodiment in accordance with this invention. The optical condenser device of this embodiment is configured of a first light source 10, a second light source 20, and an optical combiner 30.

First light source 10 is configured of a single semiconductor laser array stack 12, a plurality of collimator lenses 16, and a plurality of beam converters 18. These components are optically coupled to each other.

Figure 2:
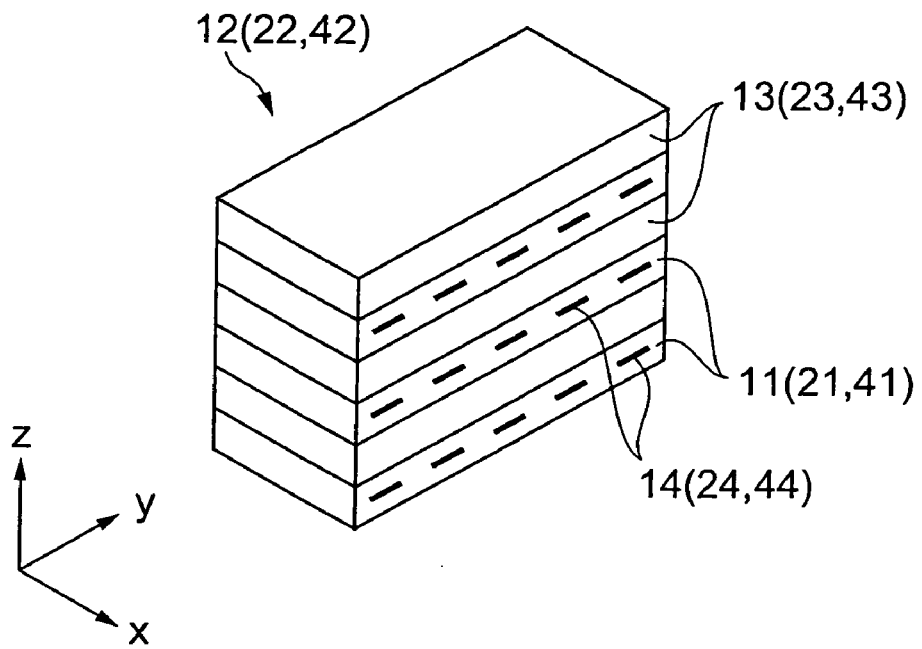
FIG. 2 is a perspective view of a semiconductor laser array stack used in the first embodiment.

FIG. 2 is a perspective view showing a semiconductor laser array stack. As shown in FIG. 2, semiconductor laser array stack 12 has a structure in which a plurality of semiconductor laser arrays 11 and a plurality of heat sinks 13 are positioned alternately in the z-direction. The x-axis, y-axis, and z-axis in FIG. 1 and FIG. 2 indicate the longitudinal direction, horizontal direction, and vertical direction, respectively, of laser array 11.

Figure 3:
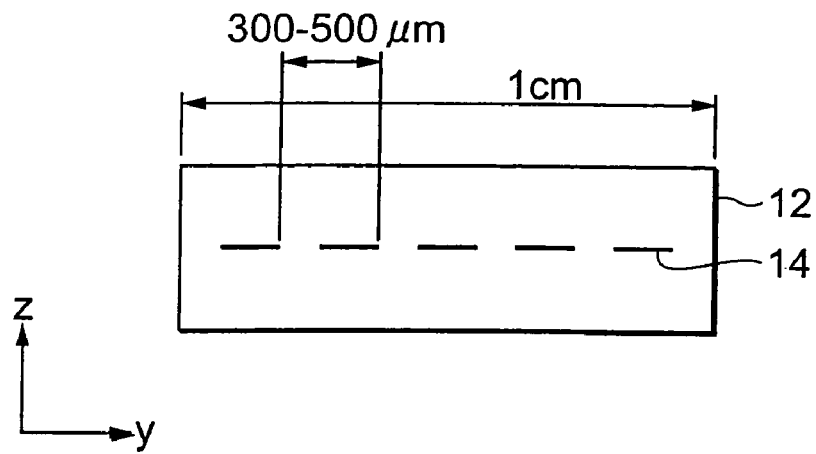
FIG. 3 shows a front end surface (light-outputting surface) of a semiconductor laser array used in the first embodiment.
Figure 4:
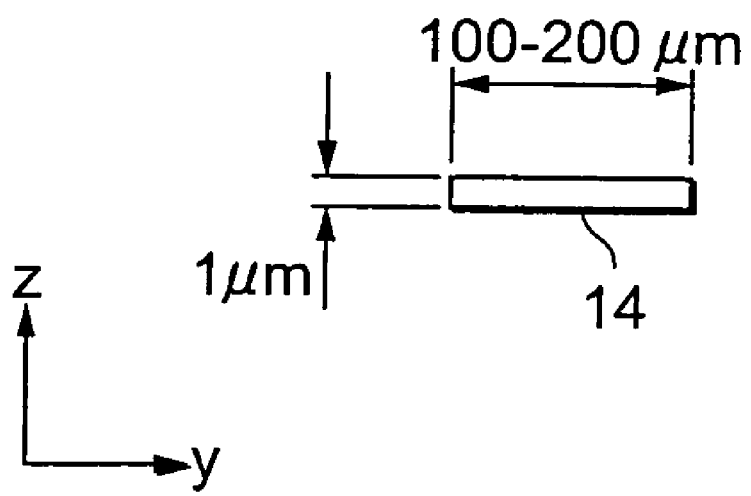
FIG. 4 shows a front end surface of an active layer of the semiconductor laser array.

FIG. 3 is a diagram showing a front end surface (light-outputting surface) of a laser array 11. FIG. 4 is a diagram showing a front end surface of an active layer 14. Each laser array 11 has a plurality of active layers 14. Active layers 14 of a laser array 11 are aligned, within a width of 1 cm, in a single row along the y-direction at intervals of 300 μm to 500 μm. Though for the sake of simplification of illustration, only five active layers 14 are drawn in the FIGURES, a larger number of active layers 14 are actually aligned. The cross section of each active layer 14 has a width of 100 μm to 200 μm and a thickness of 1 μm.

Figure 5:
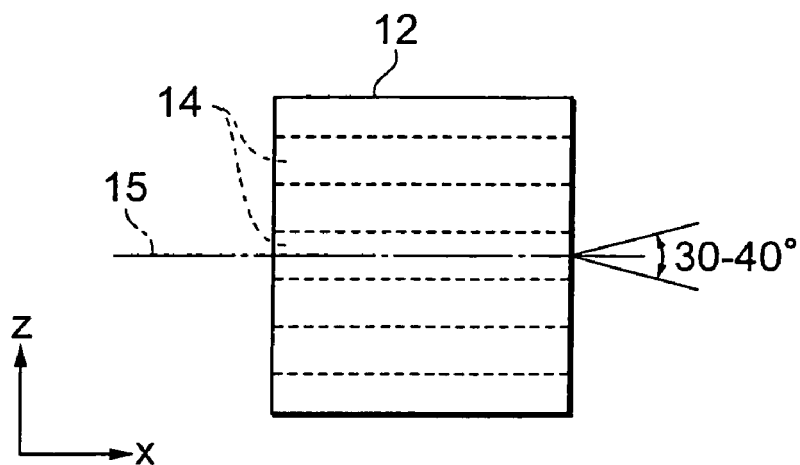
FIG. 5A and FIG. 5B illustrate the angles of spread of a beam emitted from the semiconductor laser array.
Figure 5:
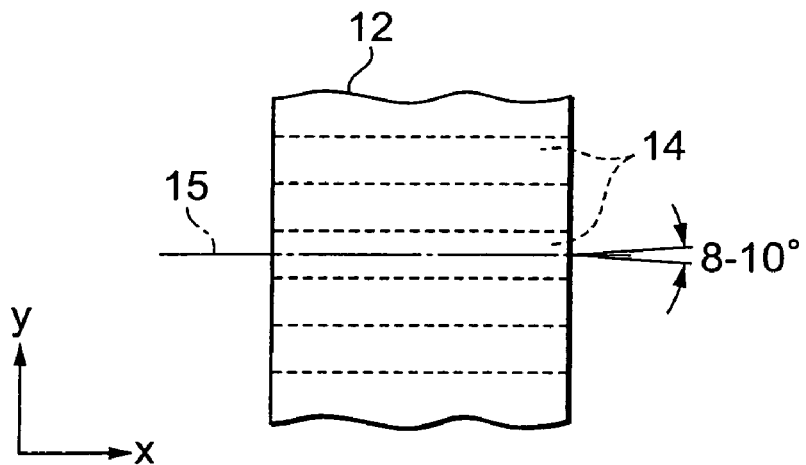

FIG. 5A and FIG. 5B illustrate the angles of spread of a beam emitted from a laser array. Also in these figures, the number 15 indicates the central axis of a beam. As shown in FIG. 5, the angles of spread of the beam emitted from this active layer 14 is 30° to 40° in the thickness direction of active layer 14, in other words, in the vertical direction (z-direction), and 8° to 10° in the width direction of active layer 14, in other words, in the horizontal direction (y-direction).

Heat, sinks 13 cool laser arrays 11. Each heat sink 13 has a cooling water path that is formed by integrating a plurality of plate-like members made of copper together. The cooling water is circulated inside this cooling water path.

Figure 6:
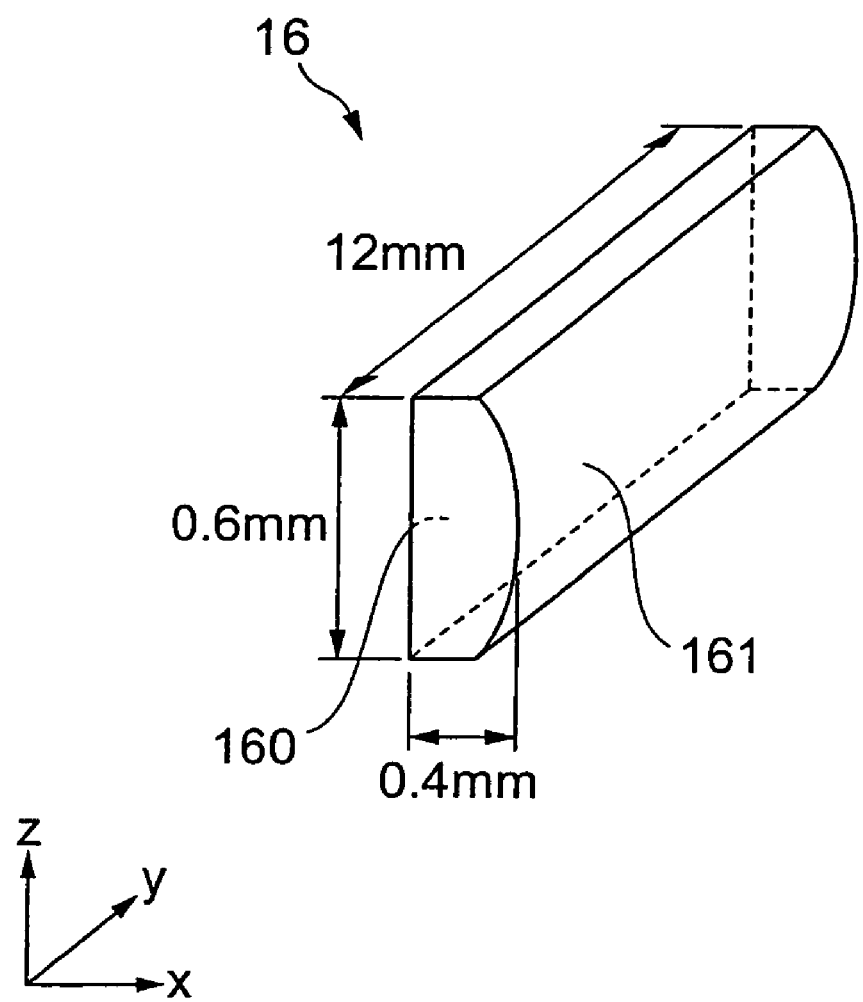
FIG. 6 is a perspective view of a cylindrical lens used in the first embodiment.

FIG. 6 is a perspective view showing a cylindrical lens as an example of collimator lens 16. Cylindrical lens 16 has an input surface 160 and an output surface 161 that oppose each other. Input surface 160 is a flat surface that is perpendicular to the x-direction and output surface 161 is a cylindrical surface having a generating line along the y-direction. Though cylindrical lens 16 does not provide a refractive action in the plane containing the generating line direction, it provides a refractive action in the plane perpendicular to the generating line. As shown in FIG. 6, the length in the generating line direction, that is, the y-direction is 12 mm, the length in the x-direction is 0.4 mm, and the length in the z-direction is 0.6 mm. Thus cylindrical lens 16 is elongated along the y-direction. The length in the y-direction is large enough for input surface 160 to cover all active layers 14 of laser array 11. Thus all the beams emitted from these active layers 14 enter cylindrical lens 16.

Since the beams emitted from active layers 14 are large in the angle of spread in the vertical direction, as mentioned above, the spread of the beams must be restrained in order to improve the condensing efficiency. Cylindrical lens 16 is thus set so that the generating line of its output surface 161 will be orthogonal to the vertical direction (z-direction) of semiconductor laser array 11. The beams emitted from active layers 14 can thereby be collimated in the vertical direction, that is, can be collimated within a plane perpendicular to the generating line of cylindrical lens 16. Collimator lenses 16 thus collimate the vertical direction (z-direction) components of the beams emitted from the respective active layers 14. In order for efficient collimation, cylindrical lenses 16 are positioned close to active layers 14. Collimator lenses 16 are thus put in one-to-one correspondence with laser arrays 11. That is, the number of collimator lenses 16 installed is equal to the number of laser arrays 11. Each collimator lens 16 is positioned so as to oppose a single laser array 11. Thus all the beams emitted from active layers 14 of each laser array 11 enter one of collimator lenses 16.

Figure 7:
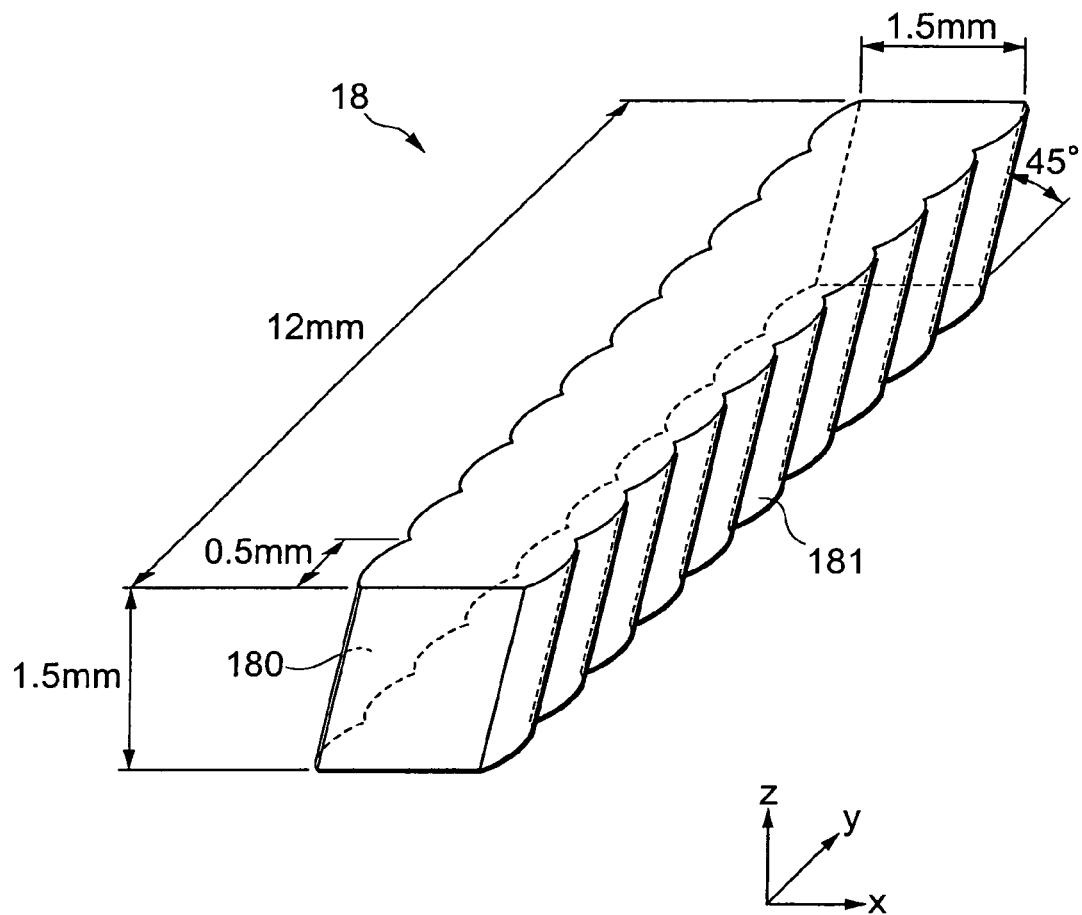
FIG. 7 is a perspective view of a beam converter used in the first embodiment.

FIG. 7 is a perspective view showing an example of first beam converter 18. Beam converter 18 is formed of glass, quartz, or other light transmitting material. The length in the x-direction is 1.5 mm, the length in the y-direction is 12 mm, and the length in the z-direction is 1.5 mm. Beam converter 18 has a shape that is elongated along the y-direction. Beam converter 18 has an input surface 180 and an output surface 181 that oppose each other. Input surface 180 has a plurality of oblique cylindrical surfaces that are aligned in parallel. The width of each oblique cylindrical surface is 0.5 mm. These oblique cylindrical surfaces extend at an angle of 45° with respect to the y-direction. The number of these oblique cylindrical surfaces is equal to the number of active layers 14. These oblique cylindrical surfaces are thus in one-to-one correspondence with active layers 14. Output surface 181 likewise has a plurality of oblique cylindrical surfaces of 0.5 mm width aligned in parallel. These oblique cylindrical surfaces also extend at an angle of 45° with respect to the y-direction and are in one-to-one correspondence with active layers 14. Thus all the beams emitted from active layers 14 of each laser array 11 enter the corresponding one of beam converters 18.

Beam converters 18 rotate the transverse sections of the beams collimated by collimator lenses 16 by substantially 90°. Beam converters 18 are thus positioned so as to be in one-to-one correspondence with cylindrical lenses 16. That is, each beam converter 18 is positioned so as to oppose the corresponding one of collimator lenses 16. Thus all the beams emitted from each cylindrical lens 16 enter the corresponding one of beam converters 18.

The beam converter used in this invention is not limited to that shown in FIG. 5. Another example of a beam converter is described, for example, in Patent Publication No. 3071360.

As with first light source 10, second light source 20 is configured of a single laser array stack 22, a plurality of cylindrical lenses 26, and a plurality of beam converters 28. These components are optically coupled to each other. Since the configurations of laser array stack 22, cylindrical lenses 26, and beam converters 28 are the same as those of laser array stack 12, cylindrical lenses 16, and beam converters 18, respectively, detailed description of these components will thus be omitted. However, the orientation of second light source 20 differs from the orientation of first light source 10. Specifically, each of laser arrays 11, which constitute laser array stack 12, has the plurality of active layers 14 aligned in parallel in the y-direction. Meanwhile, each of laser arrays 21, which constitute laser array stack 22, have a plurality of active layers 24 aligned in parallel in the x-direction. Cylindrical lenses 26 are positioned along the x-direction in correspondence to active layers 24 of laser arrays 21. Likewise, beam converters 28 are positioned along the x-direction in correspondence to active layers 24 of laser arrays 21.

Figure 8:
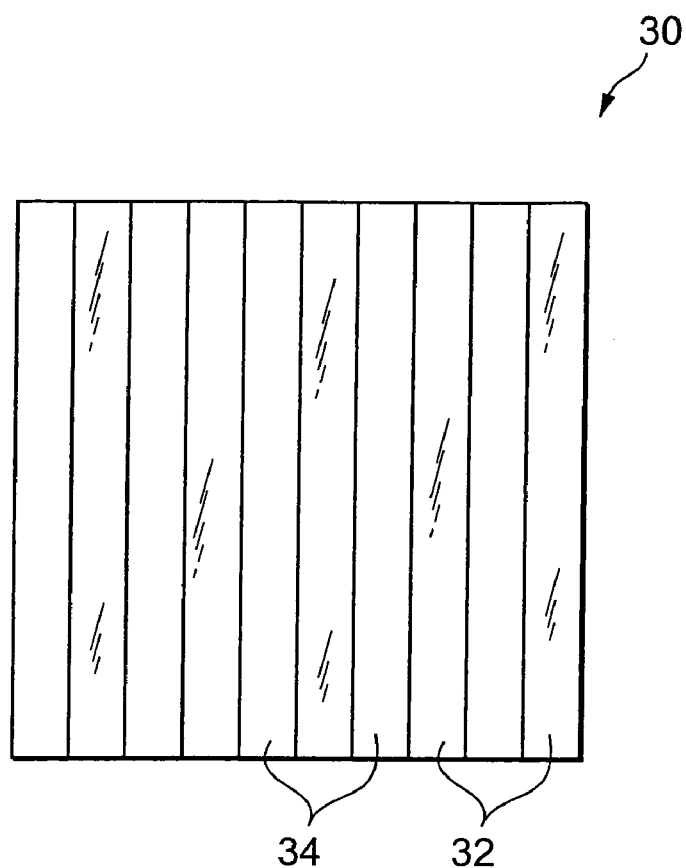
FIG. 8 is a plan view of an optical combiner used in the first embodiment.

FIG. 8 is a plan view showing optical combiner 30. Optical combiner 30 is configured of a flat plate having a plurality of transmitting portions 32 and a plurality of reflecting portions 34 positioned alternately. Transmitting portions 32 and reflecting portions 34 have a strip-like shape with the same dimension. Transmitting portions 32 and reflecting portions 34 are rectangles elongated along the direction of stacking (vertical direction) of laser arrays 11 and 21. Specifically, transmitting portions 32 and reflecting portions 34 are formed on a single flat plate made of light-transmitting material, and positioned alternately and in parallel to form stripes elongated in the z-direction. Transmitting portions 32 receive the beams emitted from first beam converter 18. A light transmitting thin film is formed on the surface of each transmitting portion 32. Meanwhile, reflecting portions 34 receive the beams emitted from second beam converters 28. A light reflecting thin film is formed on the surface of each reflecting portion 34.

Optical combiner 30 is inclined at an angle of 45° with respect to central axes 15 of the beams emitted from active layers 14 of first light source 10. Optical combiner 30 is also inclined at an angle of 45° with respect to central axes 15 of the beams emitted from active layers 24 of second light source 20. The front surface of optical combiner 30 opposes first light source 10 and the back surface of optical combiner 30 opposes second light source 20.

Each transmitting portion 32 corresponds to a single column of active layers 14, which are positioned in matrix-like form in laser array stack 12 of first light source 10. All the beams emitted from each column of active layers 14 enter the corresponding one of transmitting portions 32. Meanwhile, each arrays 11 and 21. Specifically, transmitting portions 32 and reflecting portions 34 are formed on a single flat plate made of light-transmitting material, and positioned alternately and in parallel to form stripes elongated in the z-direction. Transmitting portions 32 receive the beams emitted from first beam converter 18. A light transmitting thin film is formed on the surface of each transmitting portion 32. Meanwhile, reflecting portions 34 receive the beams emitted from second beam converters 28. A light reflecting thin film is formed on the surface of each reflecting portion 34.

Optical combiner 30 is inclined at an angle of 45° with respect to central axes 15 of the beams emitted from active layers 14 of first light source 10. Optical combiner 30 is also inclined at an angle of 45° with respect to central axes 15 of the beams emitted from active layers 24 of second light source 20. The front surface of optical combiner 30 opposes first light source 10 and the back surface of optical combiner 30 opposes second light source 20.

Each transmitting portion 32 corresponds to a single column of active layers 14, which are positioned in matrix-like form in laser array stack 12 of first light source 10. All the beams emitted from each column of active layers 14 enter the corresponding one of transmitting portions 32. Meanwhile, each reflecting portion 34 corresponds to a single column of active layers 24, which are positioned in matrix-like form in laser array stack 22 of second light source 20. All the beams emitted from each column of active layers 24 enter the corresponding one of reflecting portions 34. All the beams emitted from active layers 14 of first light source 10 are transmitted through transmitting portions 32 of optical combiner 30. Meanwhile, all beams emitted from active layers 24 of second light source 20 are reflected by reflecting portions 24 of optical combiner 30. As a result, these beams propagate in the same direction at the back surface side of optical combiner 30. As shown in FIG. 1, these beams are mixed into a single combined beam 61.

Figure 9:
FIG. 9A to FIG. 9C are diagrams illustrating the transverse sections of the beams in the first embodiment.
Figure 9:
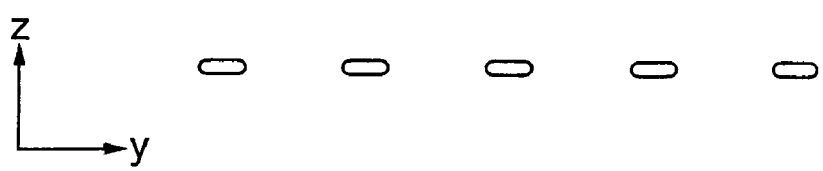
Figure 9:
Figure 10:
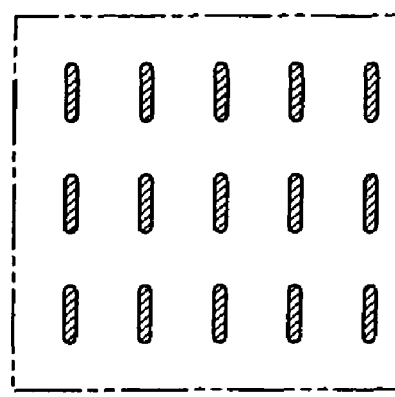
FIG. 10A to FIG. 10C are diagrams illustrating combining of the beams in the first embodiment.
Figure 10:
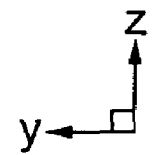
Figure 10:
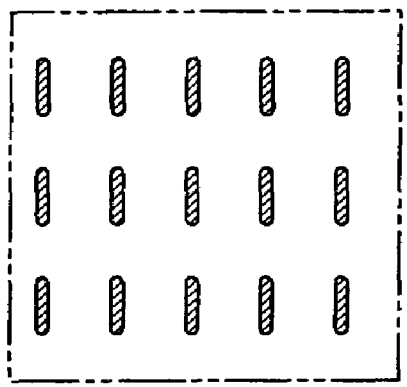
Figure 10:
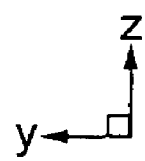
Figure 10:
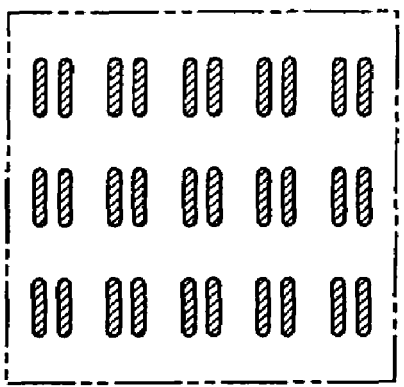
Figure 10:
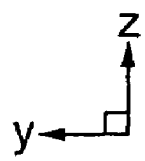

The operations of the condenser device of the present embodiment will now be described with reference to FIG. 9A to FIG. 9C and FIG. 10A to FIG. 10C. Here, FIG. 9A shows the transverse sections of the laser beams generated in active layers 14 or 24 and emitted therefrom, that is, the emission patterns. FIG. 9B shows the transverse sections of the beams emitted from active layers 14 or 24 and then transmitted through cylindrical lens 16 or 26. FIG. 9C shows the transverse sections of the beams transmitted through cylindrical lens 16 or 26 and then transmitted though beam converter 18 or 28. FIG. 10A shows the transverse sections of the beams emitted from first light source 10 and transmitted through optical combiner 30, which transverse sections are taken perpendicularly to their central axes 15. FIG. 10B shows the transverse sections of the beams emitted from second light source 20 and reflected by optical combiner 30, which transverse sections are taken perpendicularly to their central axes 15. FIG. 10C shows the transverse section of combined beam 61 of the beams from first light source 10 and the beams from second light source 20, which transverse section is taken perpendicularly to the central axis of combined beam 61. The chain double-dashed lines in FIG. 10A to FIG. 10C indicate optical combiner 30.

As shown in FIG. 4, the length of the transverse section of active layer 14 or 24 in the vertical direction is no more than 1/100th the length of the transverse section in the horizontal direction. Thus, as shown in FIG. 9A, the beam has the transverse section elongated in the horizontal direction when being emitted from active layer 14 or 24. Even if the beam emitted from active layer 14 or 24 spreads somewhat prior to reaching cylindrical lens 16 or 26, the length in the vertical direction of the transverse section of this beam can be restrained to no more than 1/1.5th the length in the horizontal direction. The beam that enters cylindrical lens 16 or 26 thus also has the transverse section elongated in the horizontal direction.

After the transmission through cylindrical lens 16 or 26, each beam is subject to the refraction in a plane perpendicular to the direction of the generating line of cylindrical lens 16 or 26. As a result, the vertical direction components of the beams are collimated as shown in FIG. 9B. Meanwhile, since the horizontal direction components of the beams are not subject to the refraction, the beams do not change in the angle of spread in the horizontal direction.

After the transmission through first cylindrical lens 16, the beams emitted from active layers 14 enter first beam converter 18. As shown in FIG. 9C, beam converter 18 rotates the transverse sections of these beams by substantially 90° about central axes 15 of the respective beams. The beams collimated in the vertical direction are thereby converted into beams collimated in the horizontal direction. As a result, the beams do not spread in the horizontal direction. The transverse section of each beam is in a shape that is long in the vertical direction and short in the horizontal direction.

As with the beams from the first light source, the vertical direction components of the beams emitted from active layers 24 of second light source 20 are collimated after being transmitted through second cylindrical lens 26. After the transmission through second beam converter 28, these beams are converted into beams collimated in the horizontal direction. As a result, in second light source 20, the beams do not spread in the horizontal direction. As with beam converters 18, the transverse section of each beam emitted from beam converter 28 is in a shape that is long in the vertical direction and short in the horizontal direction.

The beams emitted from beam converters 18 and 28 travel toward transmitting portions 32 and reflecting portions 34 of optical combiner 30, respectively. Each of transmitting portions 32 and reflecting portions 34 has a shape elongated in the vertical direction. Each beam traveling from active layer 14 or 24 to transmitting portion 32 or reflecting portion 34 is adequately narrow in width in comparison to the width of each transmitting portion 32 or reflecting portion 34. The beam emitted from each of active layers 14 and 24 is thus received within the range of the width of each transmitting portion 32 or reflecting portion 34 of optical combiner 30. In laser array stacks 12 and 22, active layers 14 and 24 are aligned in a matrix-like manner in the horizontal direction and the vertical direction. As shown in FIG. 10A, the beams emitted from each column of active layers 14 are transmitted through the corresponding transmitting portion 32. Meanwhile, as shown in FIG. 10B, the beams emitted from each column of active layers 24 are reflected by the corresponding reflecting portion 34. The beams transmitted through transmitting portions 32 and the beams reflected by reflecting portions 34 form combined beam 61. As shown in FIG. 10C, the optical density of combined beam 61 equals to the sum of the optical density of the beams emitted from first light source 10 and the optical density of the beams emitted from second light source 20. Since the beams with high optical density from laser array stacks 12 and 22 are thus combined, it is possible to obtain a beam with very high optical density.

In the above description, it is assumed that all active layers 14 and 24 are positioned at predetermined positions. However in actuality, active layers 14 and 24 can deviate from the predetermined positions in the process of stacking laser arrays 11 and 21 in assembling laser array stacks 12 and 22. In the present embodiment, combined beam 61 can be formed without the degradation of the optical density even in such a case. This will be described hereinafter.

Since laser arrays 11 and 21 are manufactured precisely by semiconductor processes, the errors in the intervals in the horizontal direction of active layers 14 and 24 in laser arrays 11 and 21 are very small. However, since laser array stacks 12 and 22 are assembled by mechanical processes, the stacking intervals of laser arrays 11 and 21 can be non-uniform. In this case, the positions of active layers 14 and 24 deviate from the predetermined positions in the vertical direction. This positional deviation is normally approximately 50 µm.

Figure 11:
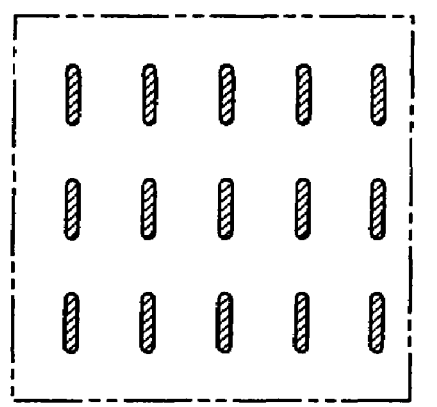
FIG. 11A to FIG. 11C illustrate the combining of the beams when positional deviation of the active layers occurs in the vertical direction.
Figure 11:
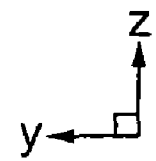
Figure 11:
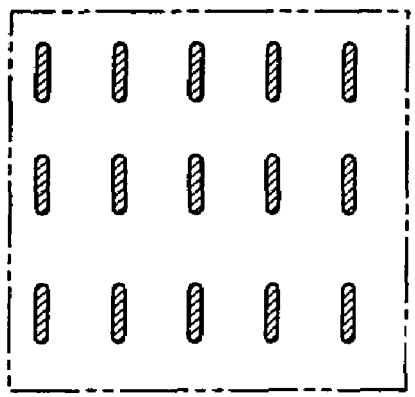
Figure 11:
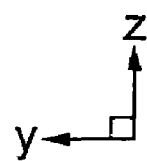
Figure 11:
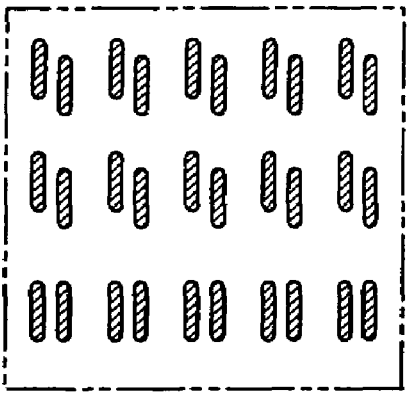
Figure 11:
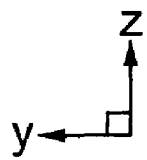

The operations of the optical condenser device of this embodiment in the case where the positional deviation in the vertical direction occurs in laser array stack 22 will now be described with reference to FIG. 11A to FIG. 11C. Here, it is assumed that there is no positional deviation in laser array stack 12. FIG. 11A shows the transverse sections of the beams emitted from first light source 10 and transmitted through optical combiner 30, which transverse sections are taken perpendicularly to their central axes 15. FIG. 11B shows the transverse sections of the beams emitted from second light source 20 and reflected by optical combiner 30, which transverse sections are taken perpendicularly to their central axes 15. FIG. 11C shows the transverse section of combined beam 61 of the beams from first light source 10 and the beams from second light source 20, which transverse section is taken perpendicularly to the central axis of combined beam 61. The chain double-dashed lines in FIG. 11A to FIG. 11C indicate optical combiner 30.

In laser array stack 22, the secondarily stacked laser array 21 is deviated in the vertical direction from the predetermined position. Thus, as shown in FIG. 11B, the beams of the upper two rows are deviated in the vertical direction. However, even if there is such positional deviation, the beams are able to enter reflecting portions 34 because, reflecting portions 34 have a shape elongated in the vertical direction. As a result, the beams from first light source 10 and the beams from second light source 20 can be combined appropriately as shown in FIG. 11C to provide high optical density.

In the above description, it is assumed that there is the vertical direction positional deviation of active layers. In effect, the positional deviation of active layers is limited to that in the vertical direction in most cases. However, there is the possibility that active layers 14 and 24 can be slightly deviated in the horizontal direction from the predetermined positions in the process of assembling laser array stacks 12 and 22.

Figure 12:
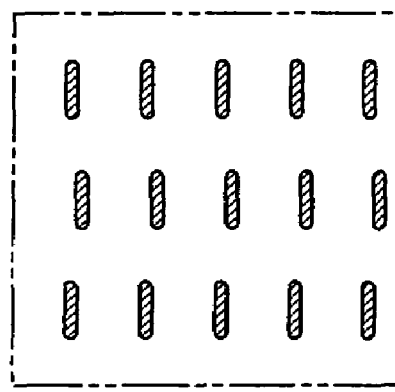
FIG. 12A to FIG. 12C illustrate combining of the beams when positional deviation of the active layers occurs in the horizontal direction.
Figure 12:
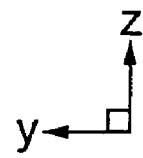
Figure 12:
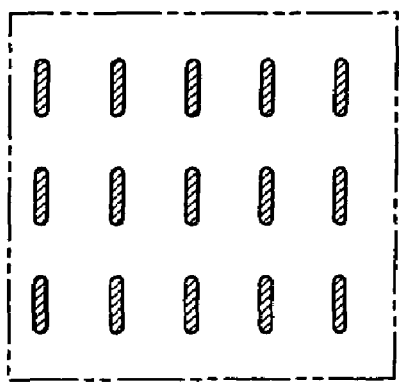
Figure 12:
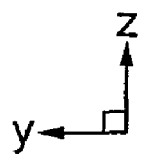
Figure 12:
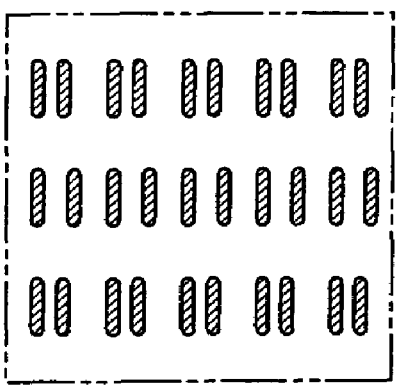
Figure 12:
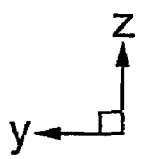

The operations of the optical condenser device of this embodiment in the case where the positional deviation occurs in the horizontal direction in laser array stack 12 will now be described with reference to FIG. 12A to FIG. 12C. Here, it is assumed that there is no positional deviation in laser array stack 22. FIG. 12A shows the transverse sections of the beams emitted from first light source 10 and transmitted through optical combiner 30, which transverse sections are taken perpendicularly to their central axes 15. FIG. 12B shows the transverse sections of the beams emitted from second light source 20 and reflected by optical combiner 30, which transverse sections are taken perpendicularly to their central axes 15. FIG. 12C shows the transverse section of combined beam 61 of the beams from first light source 10 and the beams from second light source 20, which transverse section is taken perpendicularly to the central axis of combined beam 61. The chain double-dashed lines in FIG. 12A to FIG. 12C indicate optical combiner 30.

In laser array stack 12, the secondarily stacked laser array 11 has the positional deviation in the horizontal direction. Thus, as shown in FIG. 12A, the beams of the second row are deviated towards the right. However, even if there is such positional deviation, the beams are able to enter transmitting portions 32. Due to the operations of beam converters 18, the transverse sections of the beams that enter transmitting portions 32 from active layers 14 have a shape that is long in the vertical direction and short in the horizontal direction. The widths of these beams are very narrow in comparison to the widths of transmitting portions 32. Thus, even if there is slight positional deviation in the horizontal direction in active layers 14, transmitting portions 32 can receive the beams from active layers 14. As a result, the beams from first light source 10 and the beams from second light source 20 can be combined appropriately as shown in FIG. 12C.

As described in detail above, the optical condenser device of this embodiment is able to generate a laser beam with very high optical density because the beams from two semiconductor laser array stacks 12 and 22 are combined using optical combiner 30. Since each of transmitting portions 32 and reflecting portions 34 of optical combiner 30 has a shape elongated in the vertical direction, the beams can be combined appropriately even if there is positional deviation of active layers 14 and 24 in the vertical direction.

Second Embodiment

Figure 13:
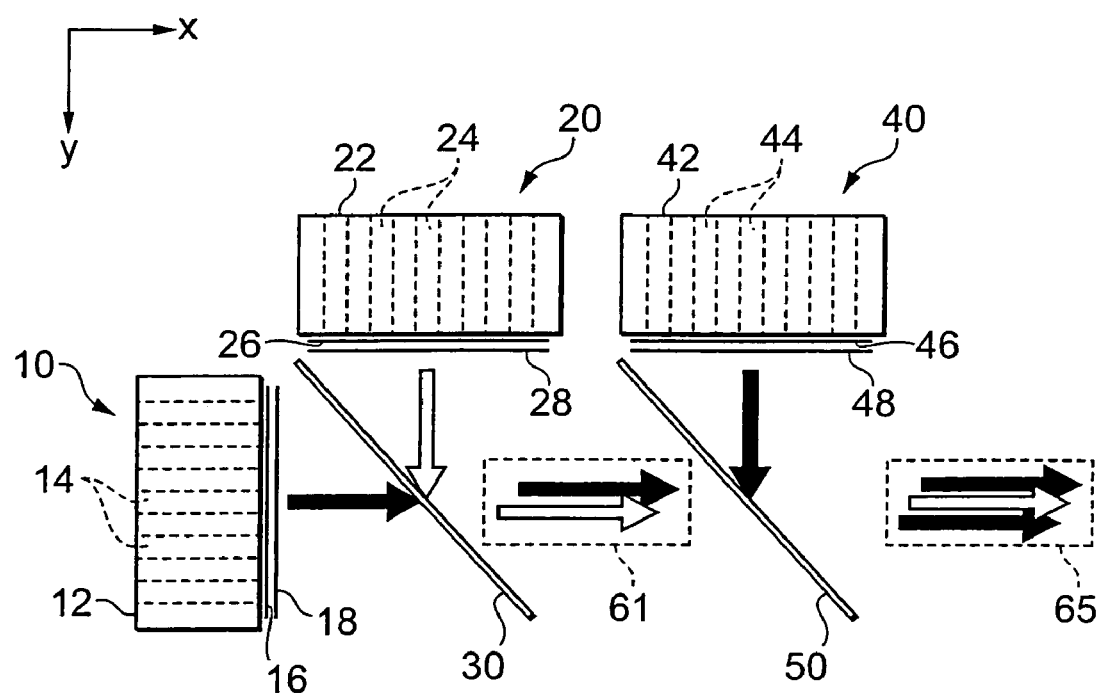
FIG. 13 is a schematic perspective view showing an optical condenser device of a second embodiment.

A second embodiment of this invention will now be described. FIG. 13 is a schematic perspective view showing an optical condenser device of this embodiment. Whereas the first embodiment is configured of two light sources and a single optical combiner, the present embodiment is configured of three light sources and two optical combiners. Whereas beams emitted from two light sources are combined in the first embodiment, beams emitted from three light sources are combined in the present embodiment.

The optical condenser device of the present embodiment is configured of a first light source 10, a second light source 20, a third light source 40, a first optical combiner 30, and a second optical combiner 50. The arrangements and positioning of first light source 10, second light source 20, and first optical combiner 30 are as described in relation to the first embodiment.

As with first light source 10 and second light source 20, third light source 40 is configured of a single laser array stack 42, a plurality of collimator lenses 46, and a plurality of beam converters 48. These are optically coupled to each other. The configurations of laser array stack 42, collimator lenses 46, and beam converters 48 are the same as those of laser array stacks 12 and 22, collimator lenses 16 and 26, and beam converters 18 and 28, respectively. As shown in FIG. 2, semiconductor laser array stack 42 has a structure in which a plurality of semiconductor laser arrays 41 and a plurality of heat sinks 43 are positioned alternately in the z-direction. Each laser array 41 has a plurality of active layers 44. Heat sinks 43 cool laser arrays 41.

Collimator lenses 46 collimate the vertical direction components of beams emitted from the respective active layers 44. Collimator lenses 46 are put in one-to-one correspondence with laser arrays 41. That is, the number of collimator lenses 46 installed is equal to the number of laser arrays 41. Each collimator lens 46 is positioned so as to oppose a single laser array 41. Thus all the beams emitted from active layers 44 of each laser array 41 enter one of collimator lenses 46.

Each beam converter 48 has an input surface and an output surface that oppose each other. Both the input surface and output surface have a plurality of cylindrical surfaces. The number of these cylindrical surfaces is equal to the number of active layers 44 of a laser array 41. That is, these cylindrical surfaces are in one-to-one correspondence with active layers 44. Thus all the beams emitted from active layers 44 of each laser array 41 enter the corresponding one of beam converters 48.

Beam converters 48 rotate the transverse sections of the beams collimated by collimator lenses 46 by substantially 90°. Beam converters 48 are thus also positioned so as to be in one-to-one correspondence with laser arrays 41 in order to efficiently convert the optical paths of the beams emitted from laser arrays 41. The number of beam converters 48 installed is thus also equal to the number of laser arrays 41. Each beam converter 48 is positioned so as to oppose the corresponding one of collimator lenses 46. Thus all the beams emitted from each cylindrical lens 46 enter the corresponding one of beam converters 48.

The orientation of third light source 40 is the same as the orientation of second light source 20 and differs from that of first light source 10. Whereas each laser array 11 of first light source 10 has active layers 14 aligned in parallel in the y-direction, laser arrays 21 and 41 of second and third light sources 20 and 40 have active layers 24 and 44 aligned in parallel in the x-direction. Each cylindrical lens 46 is thus positioned along the x-direction in correspondence to active layers 44 of semiconductor laser array 41. Likewise, each beam converter 48 is positioned along the x-direction.

As described with the first embodiment, the beams emitted from first light source 10 are transmitted through transmitting portions of first optical combiner 30. Meanwhile, the beams emitted from second light source 20 are reflected by reflecting portions of first optical combiner 30. As a result, these beams propagate in the same direction at the back surface side of first combiner 30. As shown in FIG. 13, these beams are mixed into a single combined beam 61.

Second optical combiner 50 has the same configuration as first optical combiner 30. That is, second optical combiner 50 is configured of a flat plate having a plurality of transmitting portions and a plurality of reflecting portions positioned alternately. The transmitting portions and the reflecting portions are rectangles elongated in the direction of stacking (vertical direction) of the semiconductor laser arrays. More specifically, the transmitting portions and reflecting portions are formed on a single flat plate made of light-transmitting material, and are positioned alternately and in parallel to form stripes elongated in the z-direction. The transmitting portions of second optical combiner 80 receive combined beam 61 emitted from first optical combiner 30. Meanwhile, the reflecting portions of second optical combiner 50 receive beams emitted from beam converters 48. Second optical combiner 50 is inclined at an angle of 45° with respect to the central axis of combined beam 61. Second optical combiner 50 is also inclined at an angle of 45° with respect to the central axes of the beams emitted from active layers 64 of third light source 40. The front surface of optical combiner 50 opposes first optical combiner 30 and the back surface of second optical combiner 50 opposes third light source 40. Each reflecting portion of second optical combiner 50 corresponds to one of the columns of active layers 44 that are positioned in a matrix-like form in third light source 40. All the beams emitted from each column of active layers 44 enter the corresponding one of the reflecting portions.

Combined beam 61 passes through the transmitting portions of second optical combiner 50. Meanwhile, the beams emitted from third light source 40 are reflected by the reflecting portions of second optical combiner 50. As a result, these beams propagate in the same direction at the back surface side of second optical combiner 50. As shown in FIG. 13, these beams are mixed into a single combined beam 65.

Figure 14:
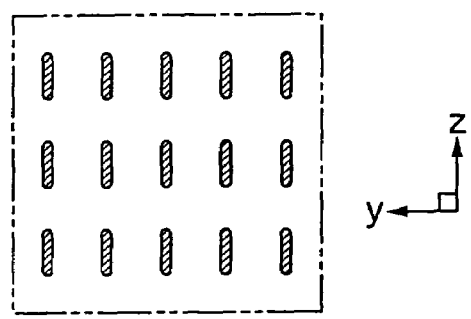
FIG. 14A to FIG. 14E are diagrams illustrating combining of beams in the second embodiment.
Figure 14:
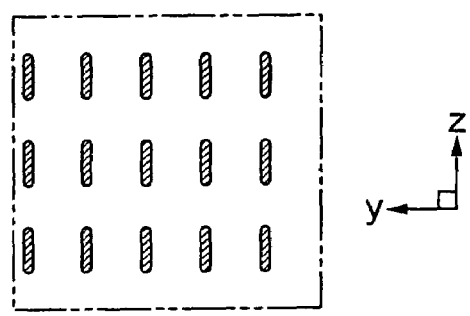
Figure 14:
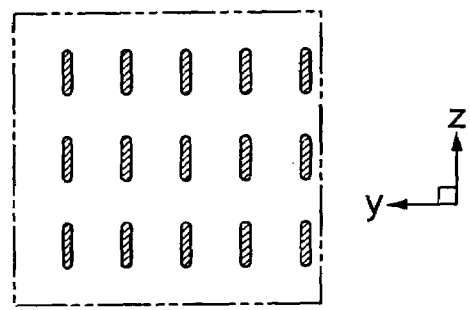
Figure 14:
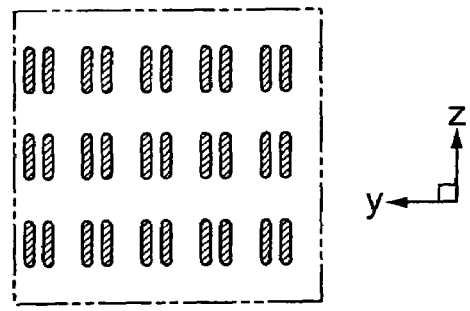
Figure 14:
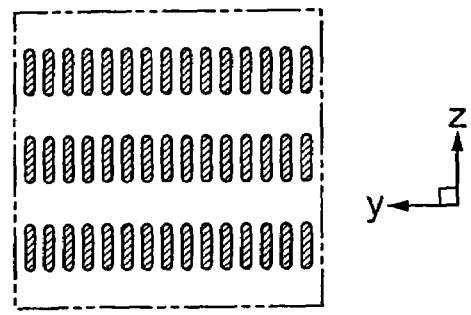

The operations and advantages of the optical condenser device of this embodiment will now be described with reference to FIG. 14A to FIG. 14E. FIG. 14A shows the transverse sections of the beams emitted from first light source 10 and transmitted through optical combiner 30, which transverse sections are taken perpendicularly to their central axes 15. FIG. 14B shows the transverse sections of the beams emitted emitted from active layers 64 of third light source 40. The front surface of optical combiner 50 opposes first optical combiner 30 and the back surface of second optical combiner 50 opposes third light source 40. Each reflecting portion of second optical combiner 50 corresponds to one of the columns of active layers 44 that are positioned in a matrix-like form in third light source 40. All the beams emitted from each column of active layers 44 enter the corresponding one of the reflecting portions.

Combined beam 61 passes through the transmitting portions of second optical combiner 50. Meanwhile, the beams emitted from third light source 40 are reflected by the reflecting portions of second optical combiner 50. As a result, these beams propagate in the same direction at the back surface side of second optical combiner 50. As shown in FIG. 13, these beams are mixed into a single combined beam 65.

The operations and advantages of the optical condenser device of this embodiment will now be described with reference to FIG. 14A to FIG. 14E. FIG. 14A shows the transverse sections of the beams emitted from first light source 10 and transmitted through optical combiner 30, which transverse sections are taken perpendicularly to their central axes 15. FIG. 14B shows the transverse sections of the beams emitted from second light source 20 and reflected by optical combiner 30, which transverse sections are taken perpendicularly to their central axes 15. FIG. 14C shows the transverse sections of the beams emitted from third light source 40 and reflected by optical combiner 50, which transverse sections are taken perpendicularly to their central axes 15. FIG. 14D shows the transverse section of combined beam 61 of the beams from first light source 10 and the beams from second light source 20, which transverse section is taken perpendicularly to the central axis of combined beam 61. FIG. 14E shows the transverse section of combined beam 65 of the combined beam 61 and the beams emitted from third light source 40, which transverse section is taken perpendicularly to the central axis of combined beam 65. The chain double-dashed lines in FIG. 14A to FIG. 14E indicate optical combiner 30 or 50.

As described with the first embodiment, the beams transmitted through transmitting portions 32 (see FIG. 14A) and the beams reflected by reflecting portions 34 (see FIG. 14B) form combined beam 61 (see FIG. 14D). Combined beam 61 is transmitted through the transmitting portions of second optical combiner 50.

Meanwhile, the beams emitted from beam converters 48 of third light source 40 are reflected by the reflecting portions of second optical combiner 50. The beams emitted from each column of active layers 44 positioned in matrix-like form in laser array stack 42 are reflected by the corresponding reflecting portion (see FIG. 14C). Combined beam 61 transmitted through the transmitting portions and the beams reflected by the reflecting portions form combined beam 65. The optical density of combined beam 65 equals to the sum of the optical density of the beams emitted from first light source 10, the optical density of the beams emitted from second light source 20, and the optical density of the beams emitted from third light source 40 (see FIG. 14E). Since beams with high optical density from semiconductor laser array stacks 12, 22, and 42 are thus combined, it is possible to obtain extremely high optical density.

The positional deviation can occur in laser array stack 12, 22, or 44; however, as in the first embodiment, second optical combiner 50 also has the transmitting portions and the reflecting portions elongated in the vertical direction. Thus combined beam 65 can be formed without degradation of the optical density even if there is the positional deviation in the laser array stacks.

The invention has been explained in detail hereinabove based on the embodiments thereof. However, the invention is not limited to the embodiments, and various modifications are possible without departing from the scope of the invention.

In the embodiments described above, a cylindrical lens is cited as an example of a collimator lens; however, a glass fiber lens or a SELFOC lens, etc., may be used instead. Also, this invention may be an optical condenser device using four or more light sources.

Figure 15:
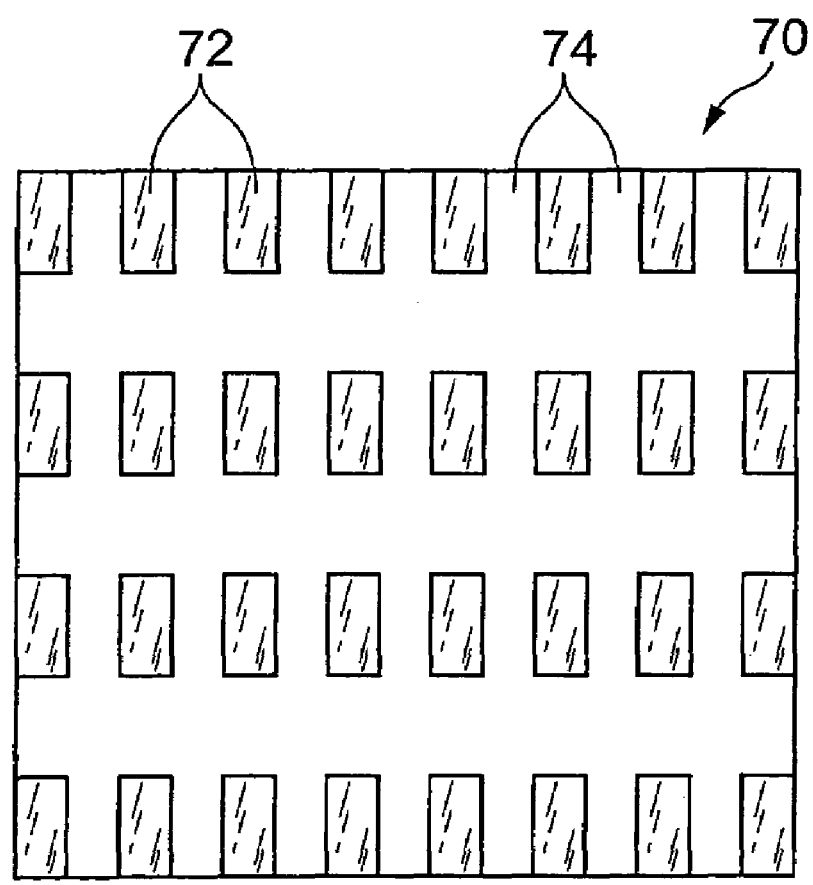
FIG. 15 shows another example of an optical combiner used in an optical condenser device in accordance with this invention.

In the above-described optical combiners 30 and 50, transmitting portions 32 and reflecting portions 34 of strip-like planar shape are positioned alternately. In place of such an optical combiner, an optical combiner 70 shown in FIG. 15 may be used. Optical combiner 70 has rectangular transmitting portions 72 positioned in matrix-like form, and lattice-like reflecting portions 74 placed between transmitting portions 72. Also, instead of reflecting portions 74, transmitting portions 72 may have a lattice-like shape and reflecting portions 74 may be rectangular.

In the second embodiment, combined beam 61 is transmitted through second optical combiner 50 and the beams emitted from third light source 40 are reflected by second optical combiner 50 to form combined beam 65. However, combined beam 65 may be formed by causing the beams emitted from third light source 40 to be transmitted through second optical combiner 50 and reflecting combined beam 61 using second optical combiner 50. In this case, the transmitting portions of second optical combiner 50 receive the beams emitted from third beam converter 48. Meanwhile, the reflecting portions of second optical combiner 50 receive combined beam 61.

With the first embodiment, an example is described in which the positional deviation occurs in either the laser array stacks of first light source 10 or the laser array stacks of second light source 20. However, in the present invention, combined beam 61 can be formed even if the positional deviation occurs in the vertical direction and/or the horizontal direction in two or more of the laser array stacks.

INDUSTRIAL APPLICABILITY

The optical condenser device in accordance with the present invention is able to appropriately combine beams emitted from a plurality of semiconductor laser array stacks using an optical combiner to generate a laser beam with very high optical density. The optical condenser device of this invention can thus be applied favorably to solid laser pumping, printing, material processing, and medical applications that require high optical density.

The invention claimed is:

1. An optical condenser device comprising:
   a first light source;
   a second light source; and
   a first optical combiner for combining beams from the first light source with beams from the second light source,
   the first light source having a first semiconductor laser array stack in which a plurality of semiconductor laser arrays, each having a plurality of active layers aligned in parallel in a first direction, are stacked in a direction perpendicular to the first direction, a first collimator lens for collimating a plurality of beams in a plane perpendicular to the first direction, which beams are emitted from the plurality of active layers, and a first beam converter for receiving the beams collimated by the first collimator lens to rotate the transverse section of each beam by substantially 90°,
   the second light source having a second semiconductor laser array stack in which a plurality of semiconductor laser arrays, each having a plurality of active layers aligned in parallel in a second direction, are stacked in a direction perpendicular to the second direction, a second collimator lens for collimating a plurality of beams in a plane perpendicular to the second direction, which beams emitted from the plurality of active layers, and a second beam converter for receiving the beams collimated by the second collimator lens to rotate the transverse section of each beam by substantially 90°, and
   the first optical combiner having one or more transmitting portions for receiving and transmitting the beams emitted from the first beam converter and one or more reflecting portions for receiving and reflecting the beams emitted from the second beam converter to combine the beams transmitted through the transmitting portions with the beams reflected by the reflecting portions, wherein the transmitting portions and the reflecting portions of the first optical combiner both have strip-like shapes elongated in the direction of stacking of the laser arrays, and the first optical combiner is a flat plate having the transmitting portions and the reflecting portions positioned alternately.

2. The optical condenser device according to claim 1, wherein the first optical combiner is inclined at an angle of 45° with respect to the central axes of both the beams emitted from the active layers of the first light source and the beams emitted from the active layers of the second light source, the front surface of the first optical combiner opposes the first light source, and the back surface of the first optical combiner opposes the second light source.

3. The optical condenser device according to claim 1, further comprising a third light source and a second optical combiner, the third light source having a third semiconductor laser array stack in which a plurality of semiconductor laser arrays, each having a plurality of active layers aligned in parallel in a third direction, are stacked in a direction perpendicular to the third direction, a third collimator lens for collimating a plurality of beams in a plane perpendicular to the third direction, which beams are emitted from the plurality of active layers, and a third beam converter for receiving the beams collimated by the third collimator lens to rotate the transverse section of each beam by substantially 90°, and the second optical combiner having one or more transmitting portions for receiving and transmitting the beams combined by the first optical combiner and one or more reflecting portions for receiving and reflecting the beams emitted from the third beam converter to combine the beams transmitted through the transmitting portions with the beams reflected by the reflecting portions.

4. The optical condenser device according to claim 1, further comprising a third light source and a second optical combiner, the third light source having a third semiconductor laser array stack in which a plurality of semiconductor laser arrays, each having a plurality of active layers aligned in parallel in a third direction, are stacked in a direction perpendicular to the third direction, a third collimator lens for collimating a plurality of beams in a plane perpendicular to the third direction, which beams are emitted from the plurality of active layers, and a third beam converter for receiving the beams collimated by the third collimator lens to rotate the transverse section of each beam by substantially 90°, and the second optical combiner having one or more transmitting portions for receiving and transmitting the beams emitted from the third beam converters and one or more reflecting portions for receiving and reflecting the beams combined by the first optical combiner to combine the beams transmitted through the transmitting portions with the beams reflected by the reflecting portions.

5. The optical condenser device according to claim 3, wherein the transmitting portions and the reflecting portions of the second optical combiner both have strip-like shapes elongated in the direction of stacking of the semiconductor laser arrays, and the second optical combiner is a flat plate having the transmitting portions and the reflecting portions positioned alternately.

6. The optical condenser device according to claim 5, wherein the second optical combiner is inclined at an angle of 45° with respect to the central axes of the beams combined by the first optical combiner and the beams emitted from the active layers of the third light source, the front surface of the second optical combiner opposes the first optical combiner, and the back surface of the second optical combiner opposes the third light source.

7. The optical condenser device according to claim 4, wherein the transmitting portions and the reflecting portions of the second optical combiner both have strip-like shapes elongated in the direction of stacking of the semiconductor laser arrays, and the second optical combiner is a flat plate having the transmitting portions and the reflecting portions positioned alternately.

8. The optical condenser device according to claim 7, wherein the second optical combiner is inclined at an angle of 45° with respect to the central axes of the beams combined by the first optical combiner and the beams emitted from the active layers of the third light source, the front surface of the second optical combiner opposes the first optical combiner, and the back surface of the second optical combiner opposes the third light source.

* * * * *